United States Patent
Jan et al.

(10) Patent No.: US 11,216,039 B2
(45) Date of Patent: Jan. 4, 2022

(54) FLEXIBLE DISPLAY

(71) Applicants: Cheng-Shiue Jan, Taipei (TW); Wei-Hao Lan, Taipei (TW); Chih-Wen Chiang, Taipei (TW); Ching-Tai Chang, Taipei (TW); Jyh-Chyang Tzou, Taipei (TW); Hsiao-Wen Tseng, Taipei (TW); Yi-Hsun Liu, Taipei (TW); Hsin Yeh, Taipei (TW)

(72) Inventors: Cheng-Shiue Jan, Taipei (TW); Wei-Hao Lan, Taipei (TW); Chih-Wen Chiang, Taipei (TW); Ching-Tai Chang, Taipei (TW); Jyh-Chyang Tzou, Taipei (TW); Hsiao-Wen Tseng, Taipei (TW); Yi-Hsun Liu, Taipei (TW); Hsin Yeh, Taipei (TW)

(73) Assignee: COMPAL ELECTRONICS, INC., Taipei (TW)

( * ) Notice: Subject to any disclaimer, the term of this patent is extended or adjusted under 35 U.S.C. 154(b) by 0 days.

(21) Appl. No.: 16/851,121

(22) Filed: Apr. 17, 2020

(65) Prior Publication Data
US 2020/0333846 A1    Oct. 22, 2020

Related U.S. Application Data

(60) Provisional application No. 62/836,737, filed on Apr. 22, 2019, provisional application No. 62/841,801, filed on May 1, 2019.

(51) Int. Cl.
*G06F 1/16* (2006.01)

(52) U.S. Cl.
CPC .......... *G06F 1/1652* (2013.01); *G06F 1/1641* (2013.01); *G06F 1/1681* (2013.01)

(58) Field of Classification Search
CPC ...... G06F 1/1641; G06F 1/1652; G06F 1/166; G06F 1/1681
See application file for complete search history.

(56) References Cited

U.S. PATENT DOCUMENTS

| | | | |
|---|---|---|---|
| 7,513,468 B2 * | 4/2009 | Jung | F16M 11/046 248/133 |
| 7,690,605 B2 * | 4/2010 | Lee | F16M 11/10 248/133 |

(Continued)

FOREIGN PATENT DOCUMENTS

| | | |
|---|---|---|
| CN | 104517557 | 4/2015 |
| CN | 104683719 | 6/2015 |

(Continued)

OTHER PUBLICATIONS

"Office Action of China Counterpart Application", dated Sep. 3, 2021, p. 1-p. 10.

*Primary Examiner* — Anthony Q Edwards
(74) *Attorney, Agent, or Firm* — JCIPRNET

(57) ABSTRACT

A flexible display includes a bottom plate, a support plate, two hinge modules, a frame body, a bending module and a flexible panel. The support plate is provided with a first end and a second end. The first end is rotatably connected to the bottom plate. The hinge modules are disposed at the second end of the support plate. The frame body is provided with a fixed frame and a plurality of turning frames. The fixed frame is connected to the hinge modules. The plurality of turning frames are pivoted to two opposite sides of the fixed frame respectively. The bending module is connected with the fixed frame and the plurality of turning frames. The flexible panel is disposed on the frame body and covers the bending module. When the flexible display is switched to a touch mode, the bending module drives the plurality of turning frames to be flush with the fixed frame so that the (Continued)

flexible panel is in a flat plate shape. When the flexible display is switched to a view mode, the bending module drives the plurality of turning frames to be bent relative to the fixed frame so that the flexible panel is in a curved shape.

6 Claims, 20 Drawing Sheets

(56) References Cited

U.S. PATENT DOCUMENTS

| | | | | |
|---|---|---|---|---|
| 7,988,113 B2* | 8/2011 | Yang | ............... | G06F 1/1601 |
| | | | | 248/276.1 |
| 9,685,984 B1* | 6/2017 | Majumdar | ............ | F16M 11/10 |
| 9,727,080 B2* | 8/2017 | Jung | ............... | G06F 1/1601 |
| 10,164,208 B2* | 12/2018 | Lee | ............... | B32B 25/20 |
| 10,760,728 B1* | 9/2020 | Maalouf | ............ | F16M 11/105 |
| 2003/0043087 A1* | 3/2003 | Kim | ............... | G06F 1/1641 |
| | | | | 345/1.1 |
| 2006/0238966 A1* | 10/2006 | Sung | ............... | F16M 11/28 |
| | | | | 361/679.05 |
| 2007/0058329 A1* | 3/2007 | Ledbetter | ........... | F16M 11/2021 |
| | | | | 361/679.06 |
| 2007/0097014 A1* | 5/2007 | Solomon | ............ | G06F 1/1662 |
| | | | | 345/1.1 |
| 2010/0059648 A1* | 3/2010 | Zhang | ............... | F16M 11/105 |
| | | | | 248/371 |
| 2012/0200991 A1* | 8/2012 | Ryu | ............... | G06F 1/1652 |
| | | | | 361/679.01 |
| 2013/0021723 A1* | 1/2013 | Harper | ............... | G06F 1/1681 |
| | | | | 361/679.01 |
| 2013/0207946 A1* | 8/2013 | Kim | ............... | G09G 3/3225 |
| | | | | 345/204 |
| 2014/0198465 A1* | 7/2014 | Park | ............... | G09F 9/301 |
| | | | | 361/749 |
| 2015/0296641 A1* | 10/2015 | Song | ............... | G06F 1/1601 |
| | | | | 361/679.01 |
| 2016/0179253 A1* | 6/2016 | Franklin | ............... | G09G 3/035 |
| | | | | 345/174 |
| 2016/0299539 A1* | 10/2016 | Jang | ............... | G06F 1/1652 |
| 2016/0324017 A1* | 11/2016 | Cho | ............... | H01L 51/5237 |
| 2017/0124937 A1* | 5/2017 | Kim | ............... | G09F 9/301 |
| 2017/0303415 A1* | 10/2017 | Deily | ............... | F16M 11/24 |
| 2017/0347466 A1* | 11/2017 | Kang | ............... | H05K 5/0226 |
| 2018/0059822 A1* | 3/2018 | Seo | ............... | G06F 3/04166 |
| 2018/0097197 A1* | 4/2018 | Han | ............... | G06F 1/3265 |
| 2018/0108330 A1* | 4/2018 | Wallace | ............... | G09G 3/20 |
| 2018/0226001 A1* | 8/2018 | Chen | ............... | G09F 15/0031 |
| 2018/0259160 A1 | 9/2018 | Chen et al. | | |
| 2020/0178404 A1* | 6/2020 | Um | ............... | H05K 5/0017 |
| 2021/0034107 A1* | 2/2021 | Therien | ............... | G06F 3/0483 |

FOREIGN PATENT DOCUMENTS

| | | |
|---|---|---|
| CN | 108885478 | 11/2018 |
| TW | I513312 | 12/2015 |
| TW | 201801059 | 1/2018 |

* cited by examiner

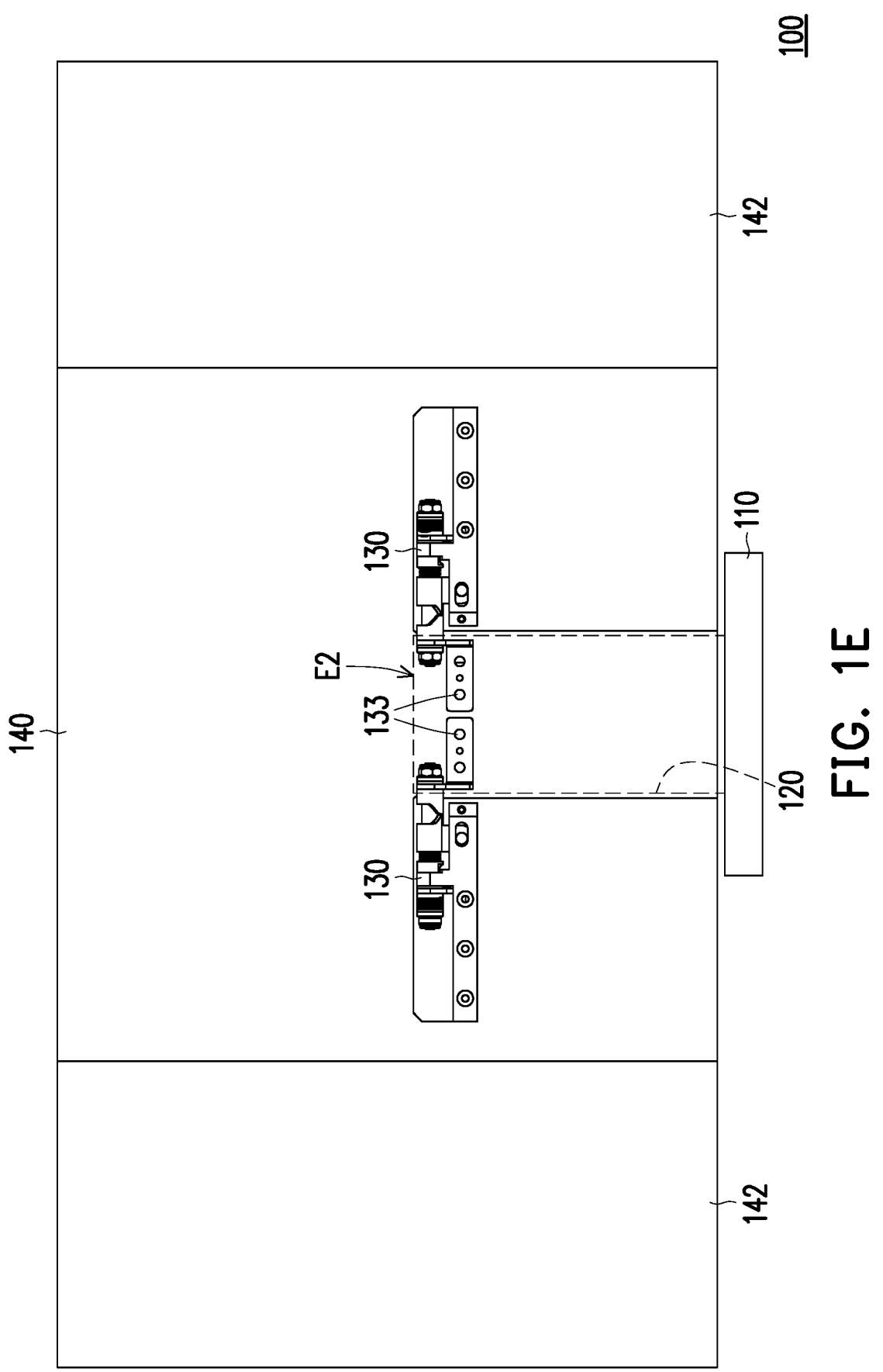

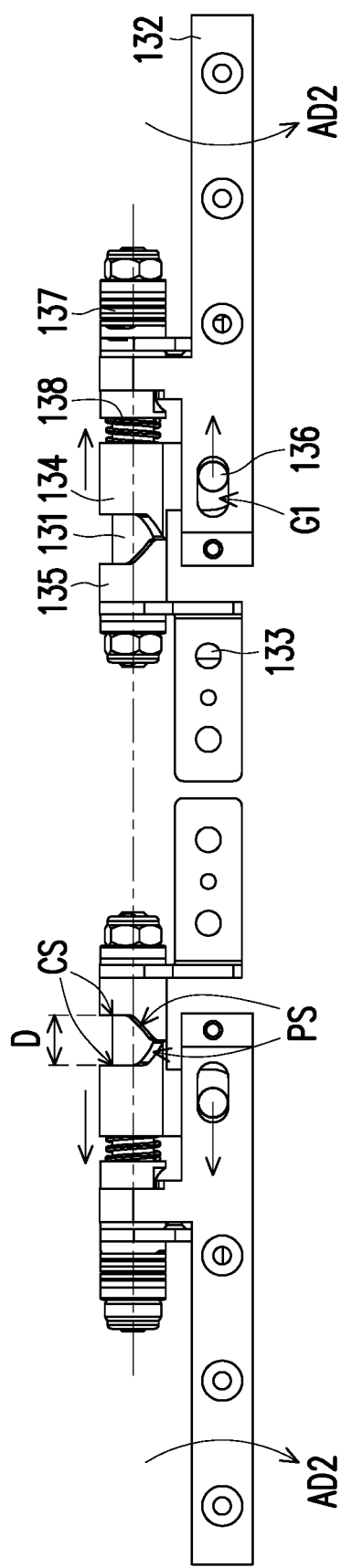
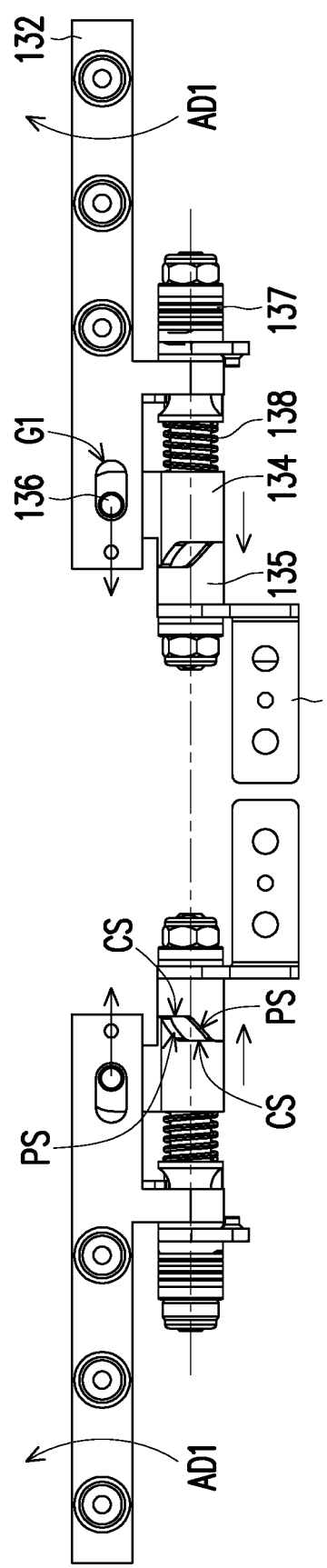
FIG. 1G
FIG. 1H

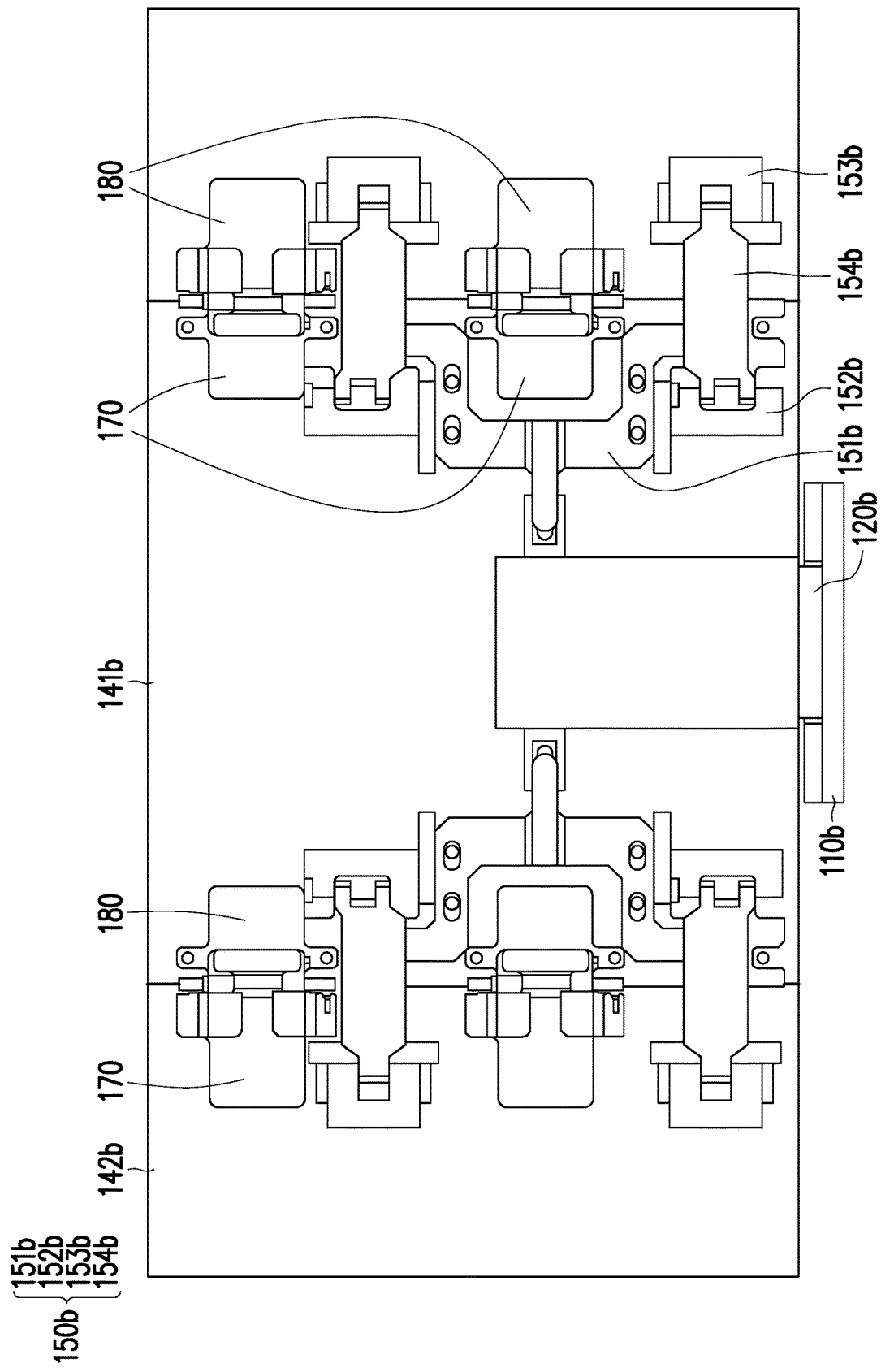

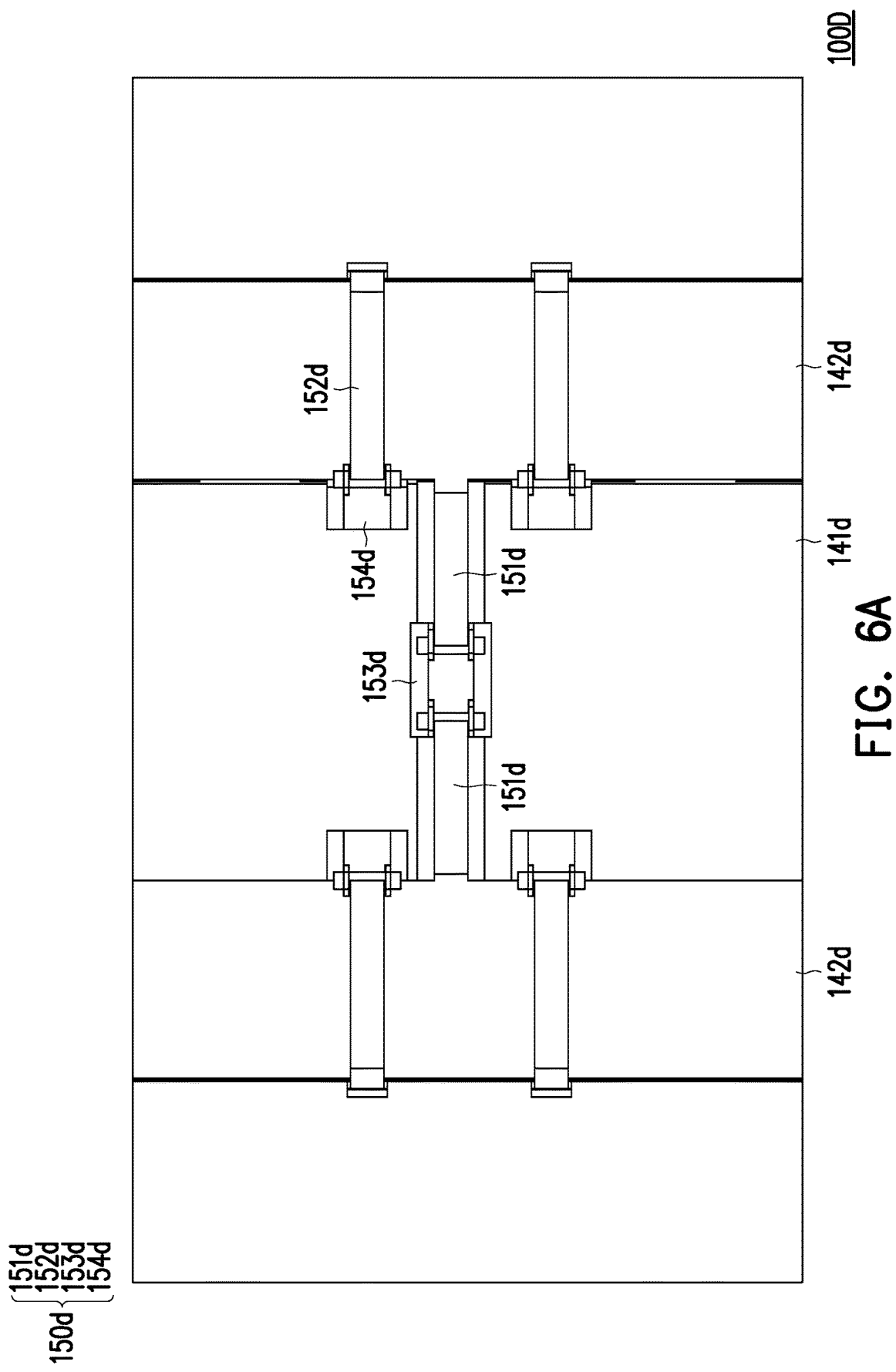

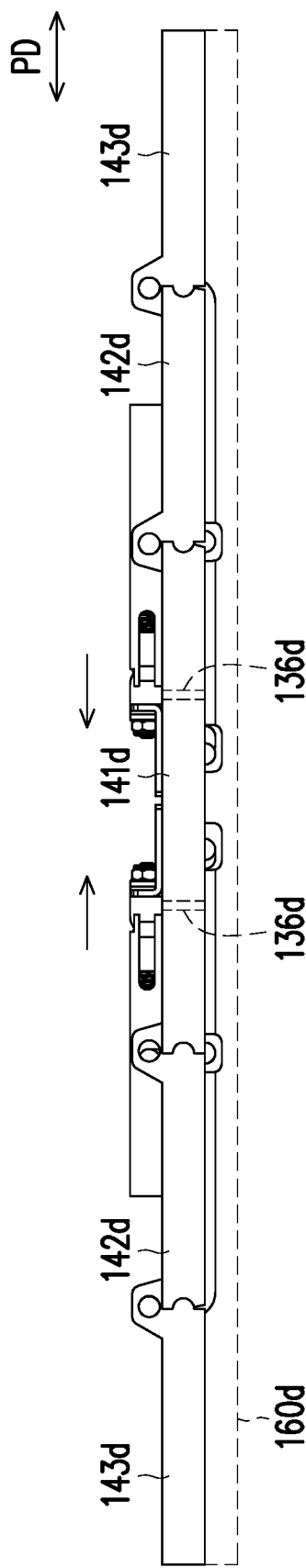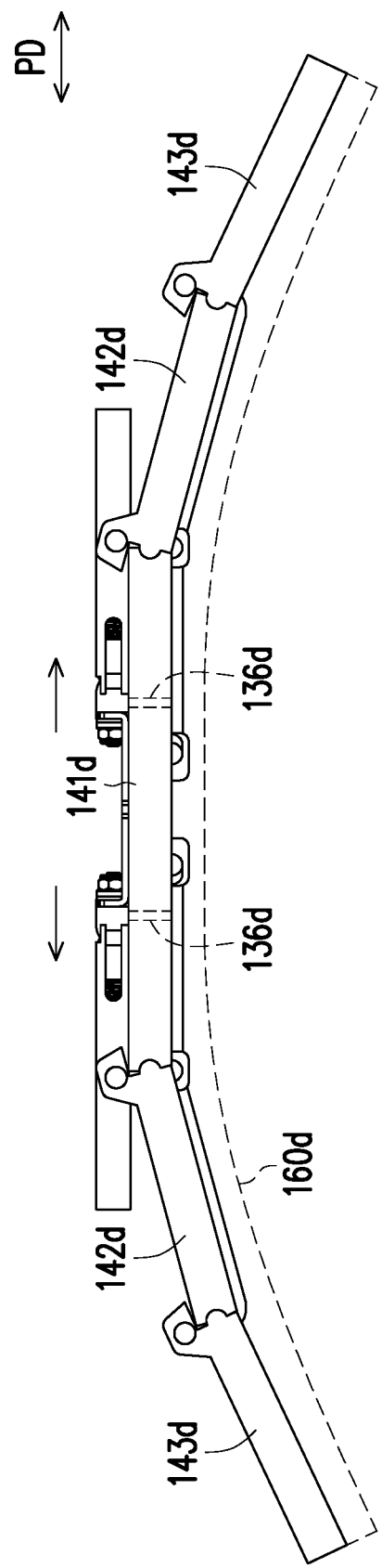

FLEXIBLE DISPLAY

CROSS-REFERENCE TO RELATED APPLICATION

This application claims the priority benefit of U.S. provisional application Ser. No. 62/836,737, filed on Apr. 22, 2019, and U.S. provisional application Ser. No. 62/841,801, filed on May 1, 2019. The entirety of each of the above-mentioned patent applications is hereby incorporated by reference herein and made a part of specification.

BACKGROUND

Technical Field

The disclosure relates to a display, and in particular, to a flexible display capable of being switched to a view mode and a touch mode.

Description of Related Art

Existing displays are mainly configured to display images, texts or movies after signal conversion. This type of displays is suitable for a television, a desktop computer, a digital signage or a flexible electronic device such as a tablet computer, a notebook computer and a smartphone. Further, as the user demand increases, existing display screens have had a touch function. However, the display screens are mostly connected to brackets perpendicular to the ground, so the display screens are suspended on a desktop and face a user. When a touch operation is conducted, the arm of the user also needs to be suspended on the desktop, and thus long-time touch operation is difficult. In addition, the touch function of the existing display screens is only limited to simple touch operations and thus does not meet the demands for touch drawing.

SUMMARY

The invention provides a flexible display capable of being switched to a view mode and a touch mode. The flexible display transforms to a curved surface so as to facilitate improvement of view experience in the view mode, and the flexible display restores to be a plane and is relatively close to the plane so as to facilitate touch drawing in the touch mode.

The flexible display of the invention includes a bottom plate, a support plate, two hinge modules, a frame body, a bending module and a flexible panel. The support plate is provided with a first end and a second end. The first end is rotatably connected to the bottom plate. The hinge modules are disposed at the second end of the support plate. The frame body is provided with a fixed frame and a plurality of turning frames. The fixed frame is connected to the hinge modules. The plurality of turning frames are pivoted to two opposite sides of the fixed frame respectively. The bending module is connected with the fixed frame and the plurality of turning frames. The flexible panel is disposed on the frame body and covers the bending module. When the flexible display is switched to the touch mode, the bending module drives the plurality of turning frames to be flush with the fixed frame so that the flexible panel is in a flat plate shape. When the flexible display is switched to the view mode, the bending module drives the plurality of turning frames to be bent relative to the fixed frame so that the flexible panel is in a curved shape.

Based on the foregoing, the flexible display of the invention is suitable for being switched to the view mode and the touch mode. In the view mode, the bending module bends the frame body so as to increase a bending radian of the flexible panel. In the touch mode, the bending module straightens the frame body so as to make the flexible panel restore to be the plane. In addition, the frame body and the flexible panel may rotate relative to the support plate through the two hinge modules so as to change an angle, so it is suitable for a long-time touch operation.

The flexible display of the invention may be quickly switched to the view mode and the touch mode, may overcome a defect that an existing display may not have a curved screen and plane touch simultaneously, and realize good user experience.

BRIEF DESCRIPTION OF THE DRAWINGS

FIG. 1E is a schematic rear view planar diagram of the flexible display in FIG. 1A.

FIG. 1G and FIG. 1H are schematic rear view planar diagrams of two hinge modules in FIG. 1E.

FIG. 4A is a schematic front view planar diagram of the flexible display in FIG. 1A adopting a bending module of a second embodiment in a view mode.

FIG. 6A is a schematic front view planar diagram of the flexible display in FIG. 1A adopting a bending module of a fourth embodiment in a touch mode.

FIG. 6B is a schematic top view planar diagram of the flexible display in FIG. 6A.

FIG. 6C is a schematic top view planar diagram of the flexible display in FIG. 6A switched to a view mode.

DESCRIPTION OF THE EMBODIMENTS

Figure 1A:
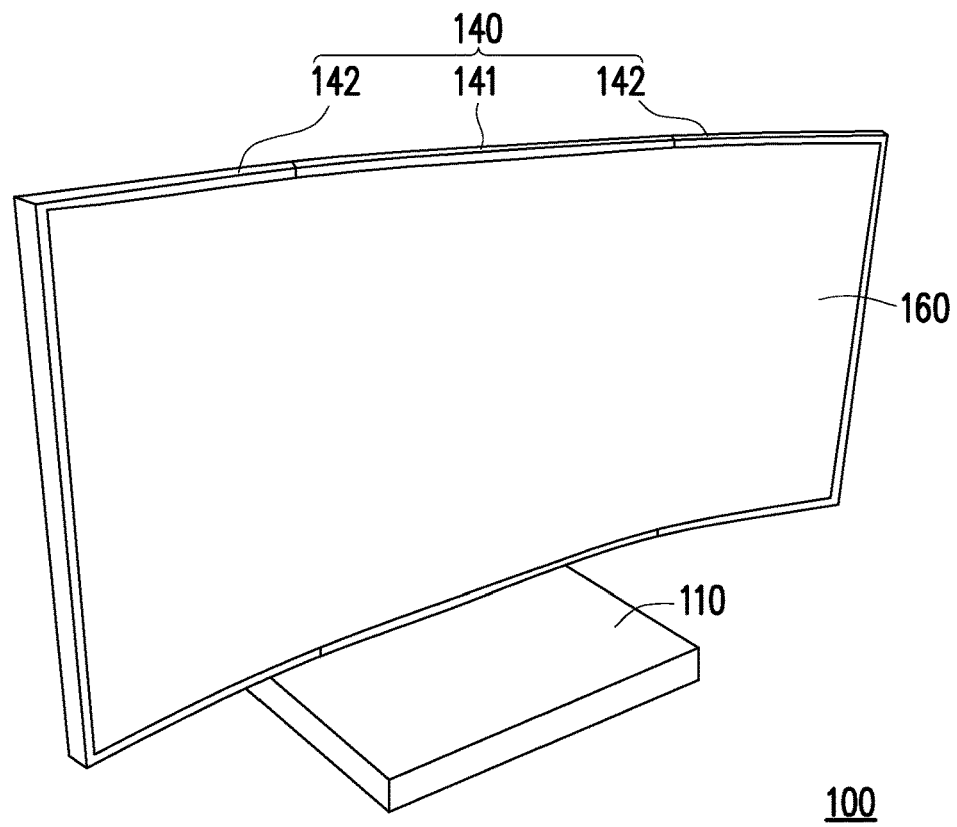
FIG. 1A is a schematic stereoscopic diagram of a flexible display in a view mode according to an embodiment of the invention.
Figure 1B:
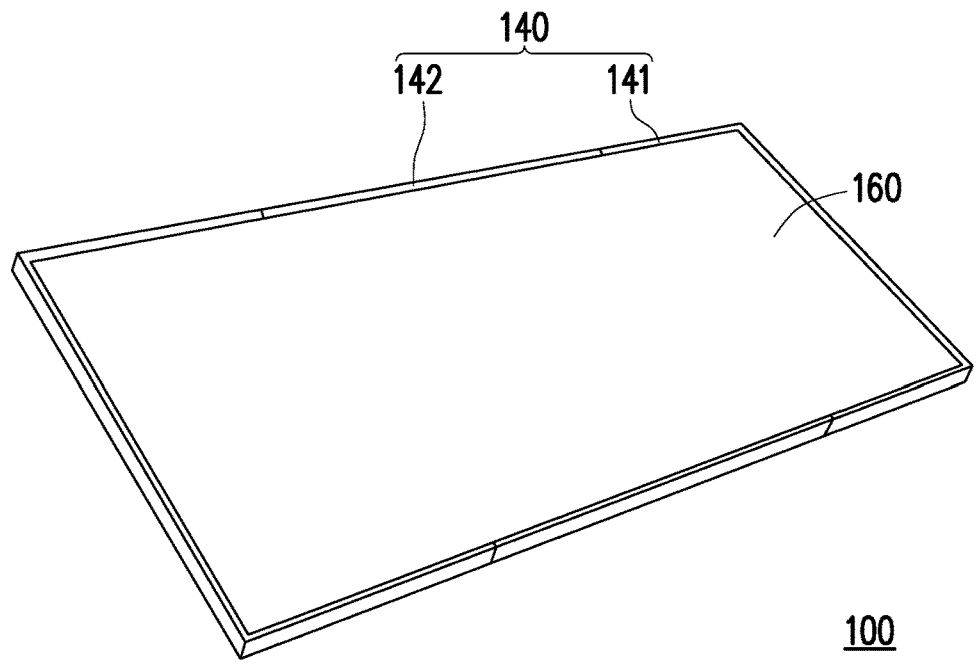
FIG. 1B is a schematic side view planar diagram of the flexible display in FIG. 1A.
Figure 1C:
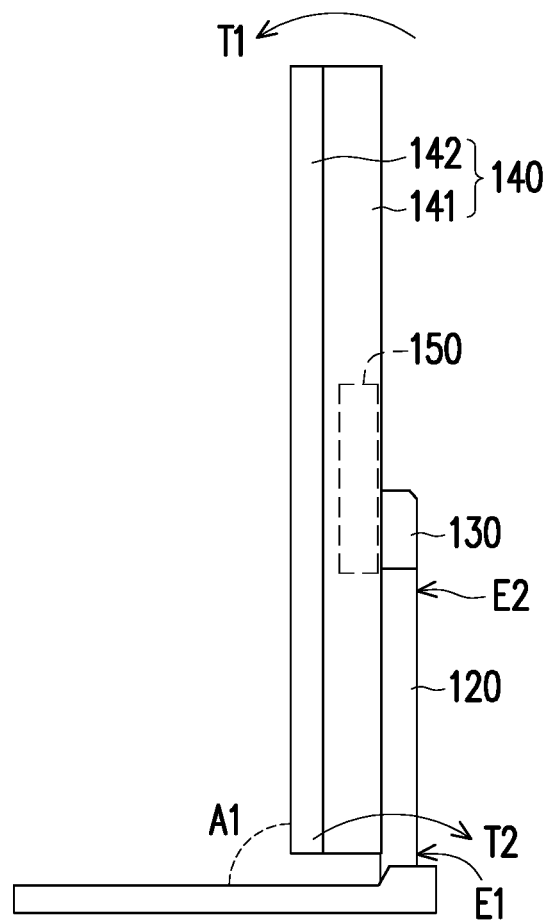
FIG. 1C is a schematic stereoscopic diagram of the flexible display in a touch mode in FIG. 1A.
Figure 1D:
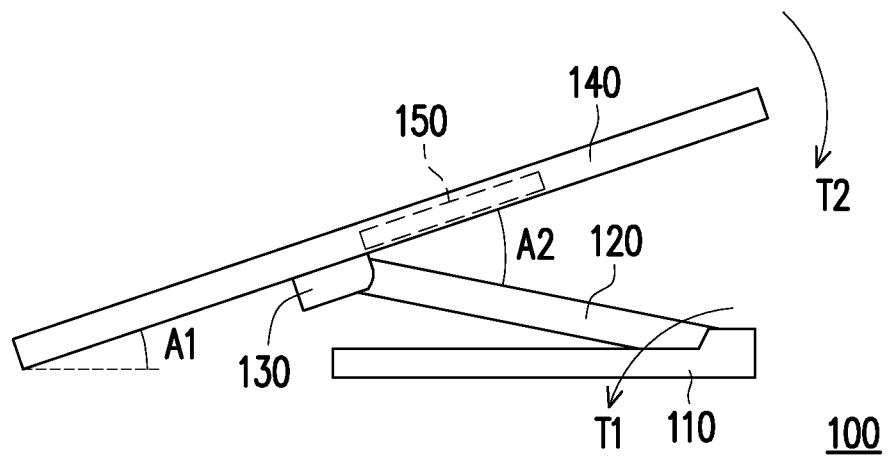
FIG. 1D is a schematic side view planar diagram of the flexible display in FIG. 1C.
Figure 1F:
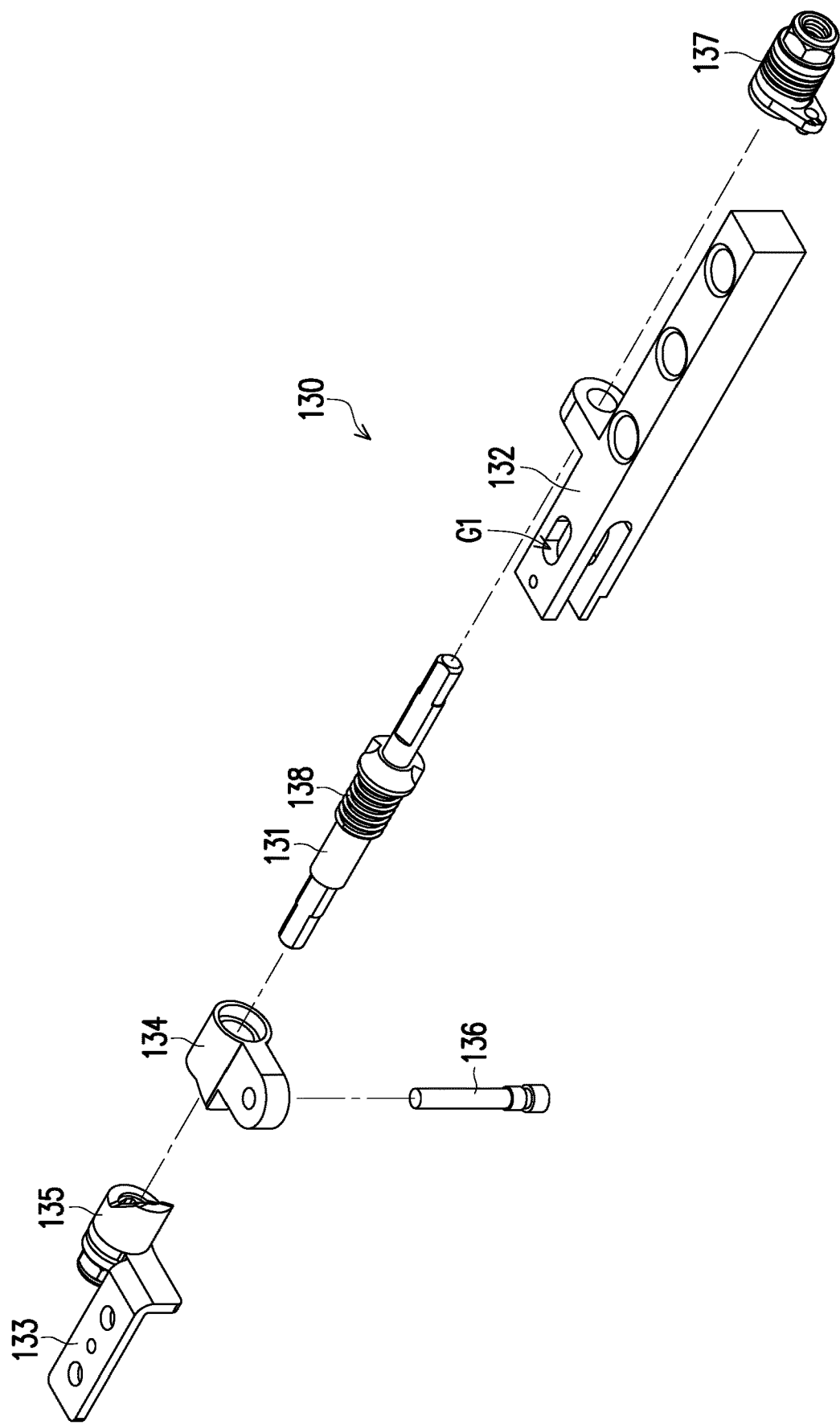
FIG. 1F is an exploded stereoscopic diagram of elements of a single hinge module in FIG. 1E.

FIG. 1A is a schematic stereoscopic diagram of a flexible display in a view mode according to an embodiment of the invention. FIG. 1B is a schematic side view planar diagram of the flexible display in FIG. 1A. FIG. 1C is a schematic stereoscopic diagram of the flexible display in a touch mode in FIG. 1A. FIG. 1D is a schematic side view planar diagram of the flexible display in FIG. 1C. FIG. 1E is a schematic rear view planar diagram of the flexible display in FIG. 1A. FIG. 1F is an exploded stereoscopic diagram and a schematic rear view planar diagram of elements of a single hinge module in FIG. 1E.

Referring to FIG. 1A to FIG. 1D, a flexible display 100 of the present embodiment such as a simple display device is combined with a desktop computer or an integrated computer to integrate a host with the display device.

The flexible display 100 includes a bottom plate 110, a support plate 120, two hinge modules 130, a frame body 140, a bending module 150 and a flexible panel 160. The bottom plate 110 is disposed on a desktop or other planes. The support plate 120 is provided with a first end E1 and a second end E2. The first end E1 is rotatably connected to the bottom plate 110. Specifically, the first end E1 is pivoted to the bottom plate 110 through a hinge structure, the hinge structure may provide a torsion to the first end E1 of the support plate 120, and thus the support plate 120 may adjust a first included angle A1 relative to the bottom plate 110.

Referring to FIG. 1C and FIG. 1E, the two hinge modules 130 are arranged in a mutually spaced manner and disposed at the second end E2 of the support plate 120 respectively. The frame body 140 is provided with a fixed frame 141 and a plurality of turning frames 142. The fixed frame 141 is connected to the two hinge modules 130, and thus may rotate relative to the support plate 120 so as to adjust a second included angle A2. The plurality of turning frames 142 are pivoted to two opposite sides of the fixed frame 141 respectively. The bending module 150 is connected with the fixed frame 141 and the plurality of turning frames 142 and is suitable for driving the plurality of turning frames 142. The flexible panel 160 is disposed on the fixed frame 141 and the plurality of turning frames 142 of the frame body 140 and covers the bending module 150.

Referring to FIG. 1B and FIG. 1D, when the flexible display is switched to the touch mode, the bending module 150 drives the plurality of turning frames 142 to be flush with the fixed frame 141 so that the flexible panel 160 is in a flat plate shape. Specifically, the support plate 120 turns in a first turning direction T1 relative to the bottom plate 110, and the first included angle A1 between the support plate 120 and the bottom plate 110 is an acute angle. The frame body 140 turns in a second turning direction T2 opposite to the first turning direction T1 relative to the support plate 120 through the two hinge modules 130, and the second included angle A2 between the frame body 140 and the support plate 120 is an acute angle. In this state, the frame body 140 is also suitable for long-time touch such as drawing and writing by abutting against the desktop or a plane.

Referring to FIG. 1A and FIG. 1C, when the flexible display 100 is switched to the view mode, the bending module 150 drives the plurality of turning frames 142 to be bent to the fixed frame 141 so that the flexible panel 160 is in a curved shape, which is similar to a principle of visual imaging of human eyes, and is conducive to reducing rotation of the eyes/a head and relieving fatigue. Specifically, the support plate 120 turns in the second turning direction T2 relative to the bottom plate 110, and the first included angle A1 between the support plate 120 and the bottom plate 110, for example, is a right angle. The frame body 140 turns in the first turning direction T1 relative to the support plate 120 through the two hinge modules 130, and the frame body 140 and the support plate 120 are parallel to each other. In this state, the frame body 140 is perpendicular to the bottom plate 110 and faces a user so as to facilitate view.

Figure 2A:
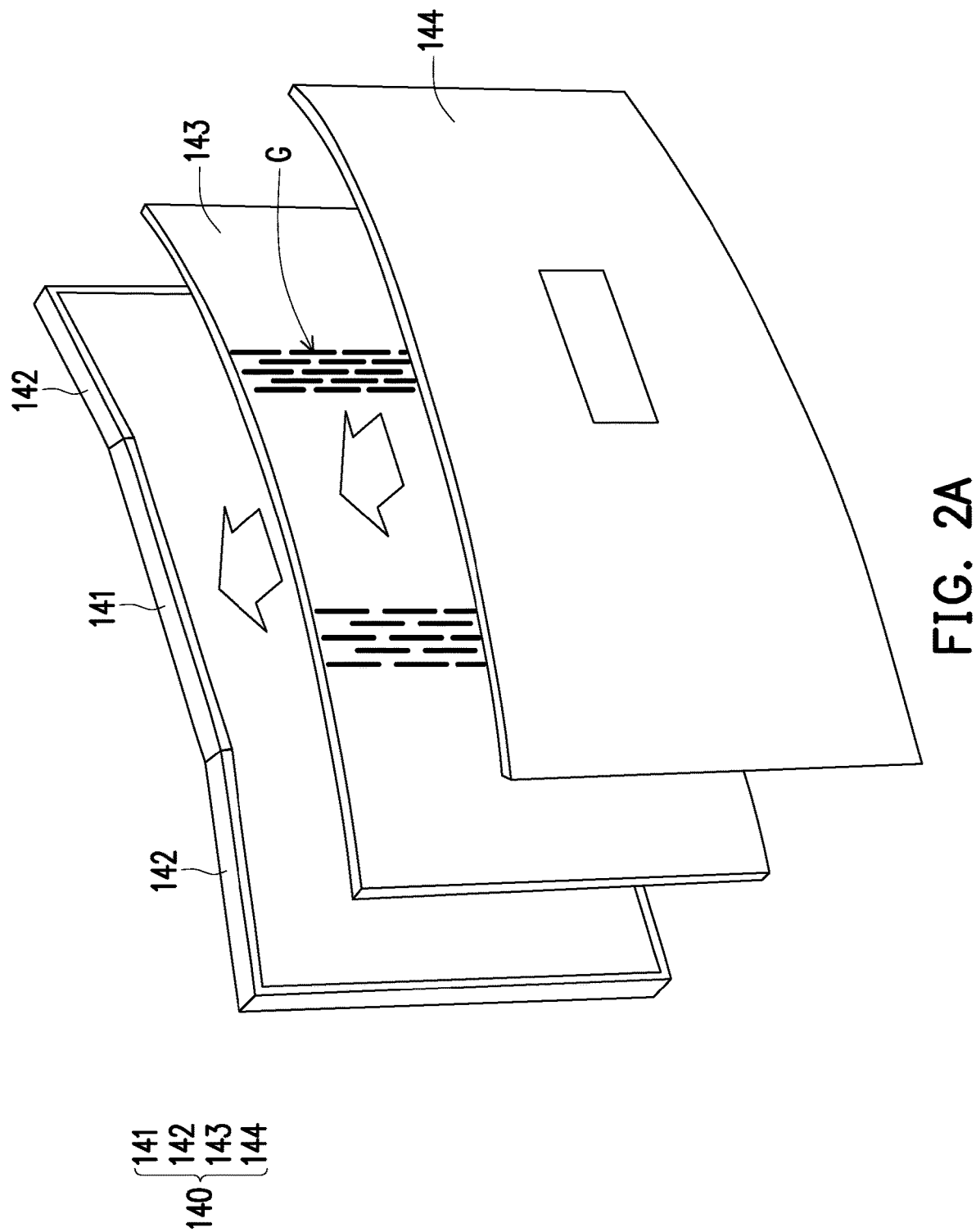
FIG. 2A is a schematic exploded diagram of part of elements of the flexible display in FIG. 1A.
Figure 2B:
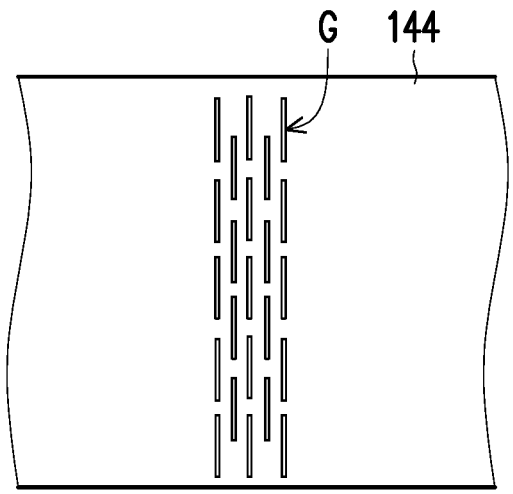
FIG. 2B is a schematic planar diagram of an unbent back cover of the flexible display in FIG. 2A.
Figure 2C:
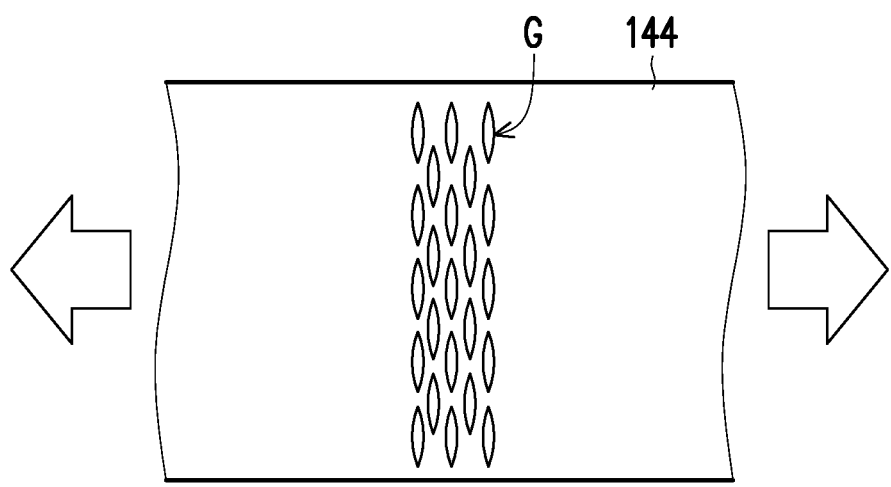
FIG. 2C is a schematic planar diagram of a bent back cover of the flexible display in FIG. 2A.

FIG. 2A is a schematic exploded diagram of part of elements of the flexible display in FIG. 1A. FIG. 2B is a schematic planar diagram of an unbent back cover of the flexible display in FIG. 2A. FIG. 2C is a schematic planar diagram of a bent back cover of the flexible display in FIG. 2A.

Referring to FIG. 2A, the frame body 140 further includes a back cover 143 and a covering outer layer 144. The back cover 143 is disposed on the other side of the frame body 140 relative to the flexible panel 160, and connected to the fixed frame 141 and the two turning frames 142. The covering outer layer 144 is disposed on the back cover 143. Further, the back cover 143 is provided with a plurality of gaps G arranged in a staggered manner. Referring to FIG. 2B, in the view mode, the back cover 143 does not bend, and the plurality of gaps G are in a long strip shape. Referring to FIG. 2C, in the view mode, the back cover 143 and the covering outer layer 144 bend along with the two turning frames 142 of the frame body 140 so that each of the gaps G is in an oval shape, and its size is greater than a size of each of the gaps G in the touch mode.

Additionally, the plurality of gaps G of the back cover 143 are conductive to improving characteristics of bending and ductility, and the back cover 143 may elastically deform along with turning of the two turning frames 142. The covering outer layer 144, for example, is leather, a fabric or a ductile flexible material, and this is conductive to shielding the gaps G generated by bending of the back cover 143.

Referring to FIG. 1E and FIG. 1F, each of the hinge modules 130 includes a rotating shaft 131, a first bracket 132, a second bracket 133, a first cam member 134, a second cam member 135, a linkage pin 136, a torsion member 137 and an auxiliary elastic member 138.

The first bracket 132 is rotatably sleeved on the rotating shaft 131 and connected with the fixed frame 141 and the back cover 143 of the frame body 140. The first bracket 132 is provided with a first sliding groove G1. The second bracket 133 is fixedly sleeved on the rotating shaft 131 and connected with the second end E2 of the support plate 120. The first cam member 134 is rotatably and movably sleeved on the rotating shaft 131. The second cam member 135 is fixedly sleeved on the rotating shaft 131 and is adjacent to the second bracket 133. The linkage pin 136 penetrates through the first cam member 134 and the first sliding groove G1 of the first bracket 132 and connected with the bending module 150.

Additionally, the first cam member 134 and the second cam member 135 are provided with a protruding surface PS and a concave surface CS respectively. The torsion member 137 is fixedly sleeved on one end of the rotating shaft 131 away from the second cam member 135 and is in contact with the first bracket 132 so as to provide a torsion. The auxiliary elastic member 138 is sleeved on the rotating shaft 131 and abuts against the first cam member 134 so as to provide an elastic force.

FIG. 1G and FIG. 1H are schematic rear view planar diagrams of the two hinge modules in FIG. 1E.

Referring to FIG. 1H, when pivoting in a first axial direction AD1, the first bracket 132 drives the first cam member 134 to slide on the rotating shaft 131 so as to closely abut against the second cam member 135 (that is, the two protruding surfaces PS abut against the two concave surface CS respectively), and the first cam member 134 drives the linkage pin 136 to move relatively close to the second cam member 135. Referring to FIG. 1E and FIG. 1G, when pivoting in a second axial direction AD2 opposite to the first axial direction AD1, the first bracket 132 drives the first cam member 134 to slide on the rotating shaft 131 so as to partly abut against the second cam member 135 (that is, the two protruding surfaces PS abut against each other) and form a distance D (that is, the two concave surface CS are spaced from each other), and the first cam member 134 drives the linkage pin 136 to move relatively away from the second cam member 135.

Figure 3A:
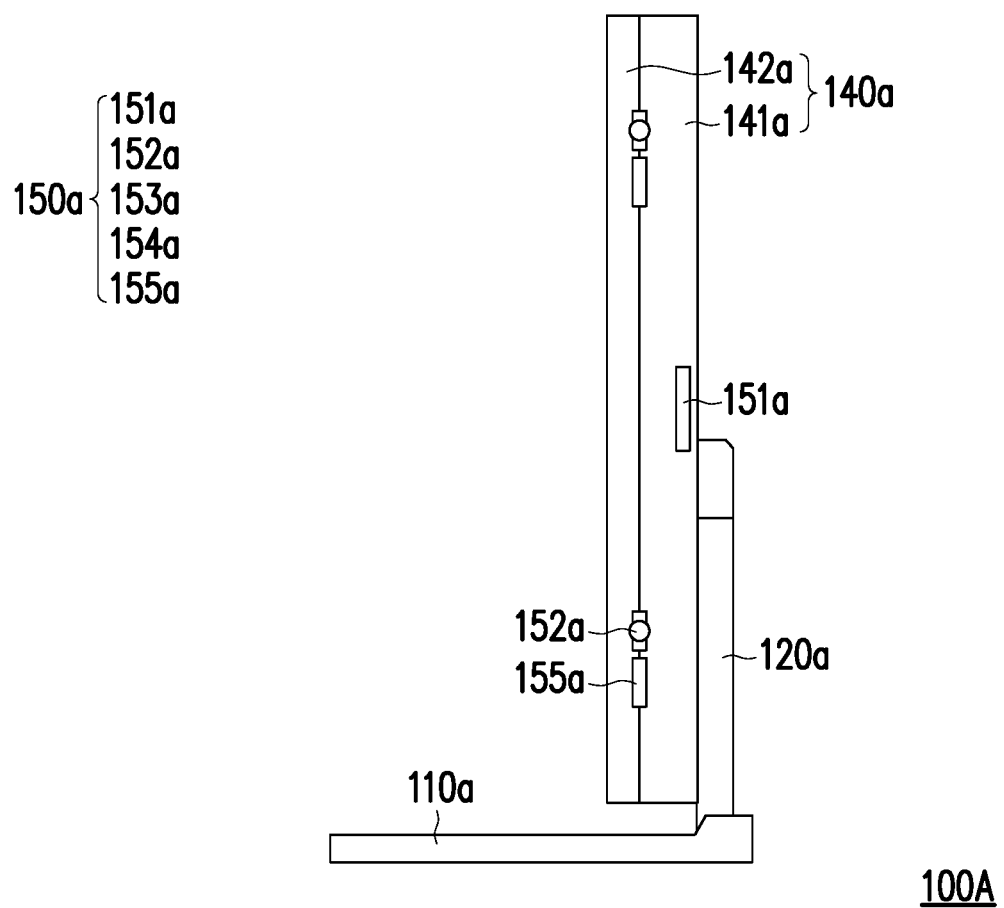
FIG. 3A is a schematic planar diagram of the flexible display in FIG. 1A adopting a bending module of a first embodiment in a view mode.
Figure 3B:
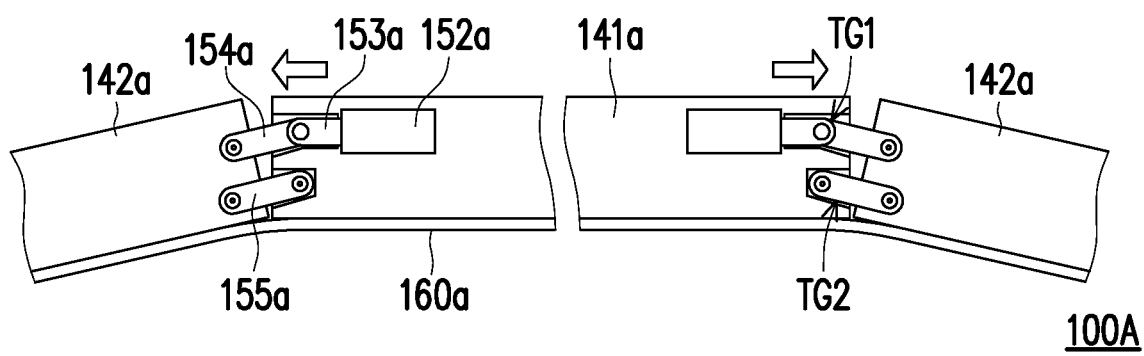
FIG. 3B is a schematic motion diagram of switching the bending module in FIG. 3A to a touch mode.
Figure 3C:
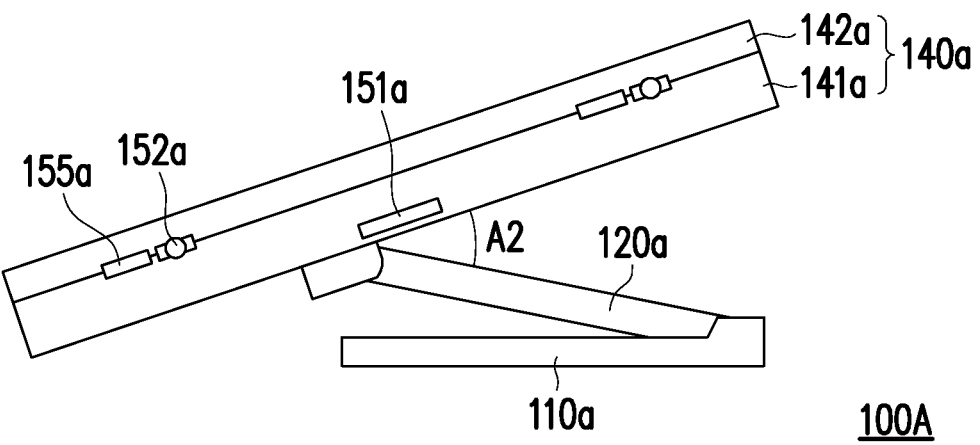
FIG. 3C is a schematic planar diagram of the flexible display in the touch mode in FIG. 3A.
Figure 3D:
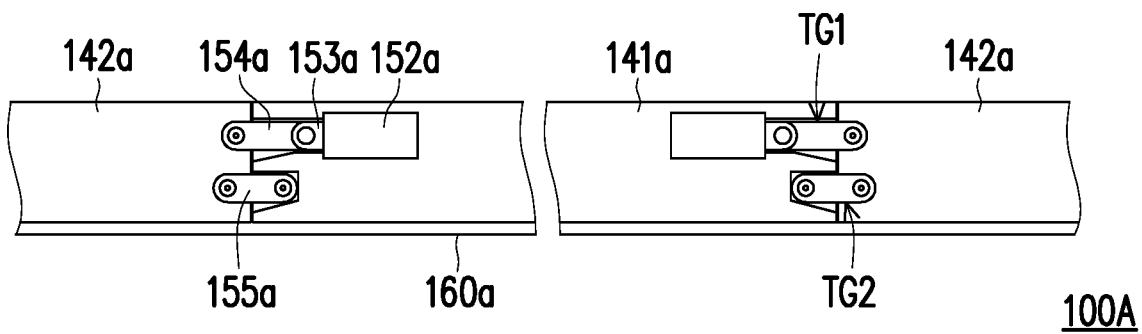
FIG. 3D is a schematic motion diagram of switching a bending module in FIG. 3C to the touch mode.

FIG. 3A is a schematic planar diagram of the flexible display in FIG. 1A adopting a bending module of a first embodiment in a view mode. FIG. 3B is a schematic motion diagram of switching the bending module in FIG. 3A to a touch mode. FIG. 3C is a schematic planar diagram of the flexible display in the touch mode in FIG. 3A. FIG. 3D is a schematic motion diagram of switching a bending module in FIG. 3C to the touch mode.

Referring to FIG. 3A and FIG. 3B, a bending module 150a adopted by a flexible display 100A of the present embodiment includes an angle sensor 151a, a plurality of motors 152a, a plurality of push rods 153a, a plurality of first connection rods 154a and a plurality of second connection rods 155a.

The angle sensor 151a is disposed in a fixed frame 141a of a frame body 140a. The plurality of motors 152a are disposed on two sides of the fixed frame 141a adjacent to a plurality of turning frames 142a respectively and coupled to the angle sensor 151a. The plurality of push rods 153a are connected with the plurality of motors 152a and the plurality of turning frames 142a. Specifically, the fixed frame 141a is provided with a plurality of first tilted grooves TG1 and a plurality of second tilted grooves TG2. Two ends of each of the first connection rods 154a are pivoted to each of the push rods 153a and each of the turning frames 142a respectively and located in each of the corresponding first tilted grooves TG1. Two ends of each of the second connection rods 155a are pivoted to the fixed frame 141a and each of the turning frames 142a respectively and located in each of the corresponding second tilted grooves TG2.

The angle sensor 151a is configured to sense a second included angle A2 between the frame body 140a and a support plate 120a.

Referring to FIG. 3A and FIG. 3B, when the second included angle A2 is less than a predetermined angle, the angle sensor 151a starts the plurality of motors 152a so as to drive the plurality of push rods 153a to respectively drive the plurality of first connection rods 154a to move along the plurality of first tilted grooves TG1. Meanwhile, the plurality of second connection rods 155a pivot in the plurality of second tilted grooves TG2 to make the plurality of turning frames 142a be bent to the fixed frame 141a (as shown in FIG. 3A and FIG. 3B, it is in the view mode at this time) so as to bend a flexible panel 160a.

Referring to FIG. 3C and FIG. 3D, when the second included angle A2 is greater than the predetermined angle, the angle sensor 151a starts the plurality of motors 152a so as to drive the plurality of push rods 153a to respectively drive the plurality of first connection rods 154a to move along the plurality of first tilted grooves TG1. Meanwhile, the plurality of second connection rods 155a pivot in the plurality of second tilted grooves TG2 to make the plurality of turning frames 142a be flush with the fixed frame 141a (as shown in FIG. 3C and FIG. 3D, it is in the touch mode at this time) so as to straighten the flexible panel 160a.

Cooperatively referring to FIG. 3A and FIG. 3B, further, the flexible display 100A of the present embodiment is suitable for disassembling of a bottom plate 110a, and abuts against a desktop or a plane respectively only through the support plate 120a and the frame body 140a.

Figure 4B:
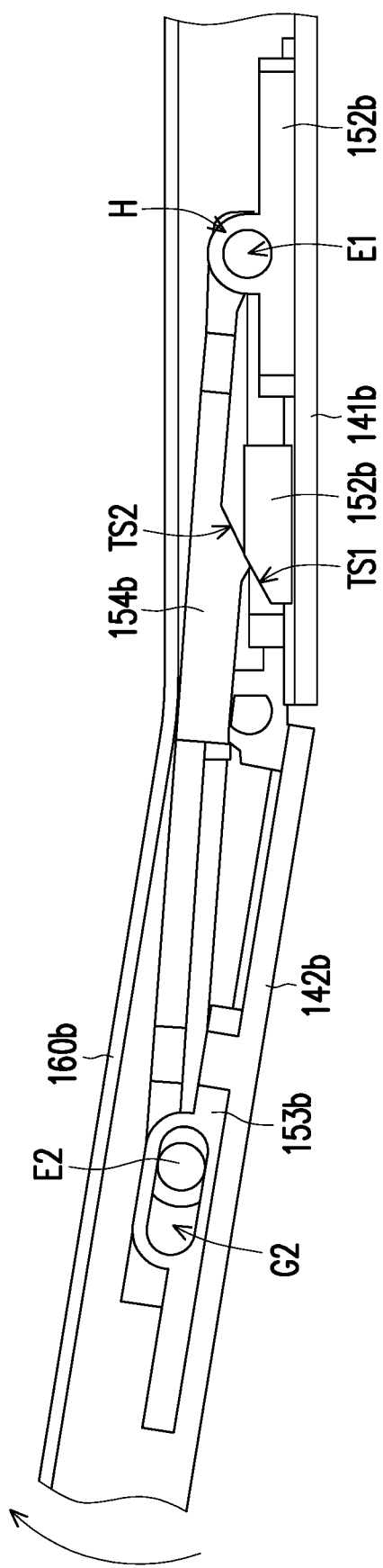
FIG. 4B is a schematic cross-sectional diagram of the flexible display in FIG. 4A along a line segment AA.
Figure 4C:
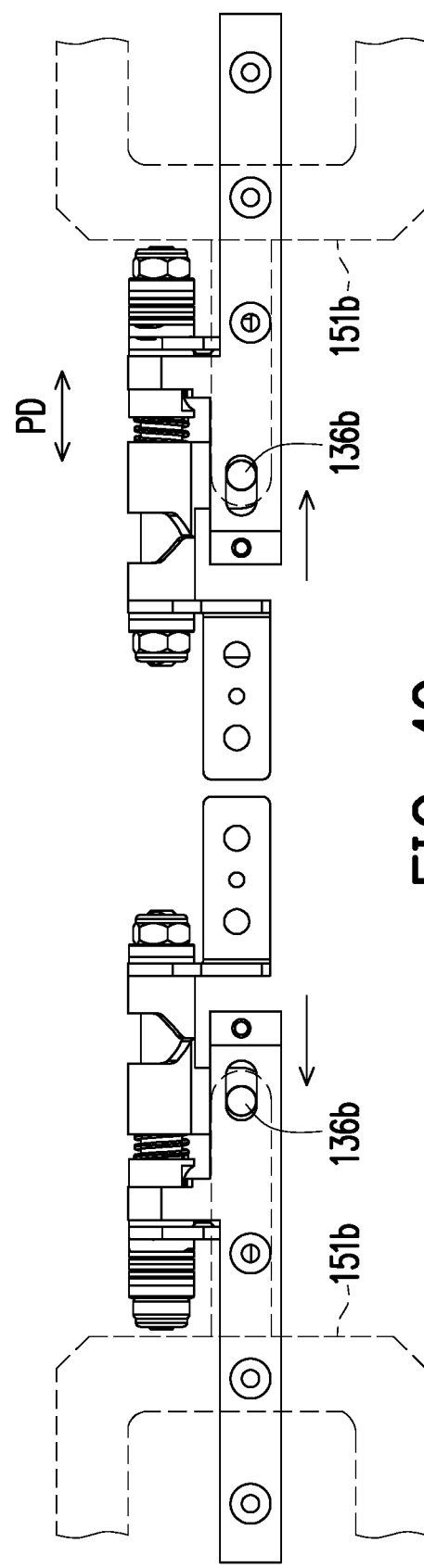
FIG. 4C is a schematic diagram of a position relationship between the bending module in FIG. 4A and two hinge modules.
Figure 4D:
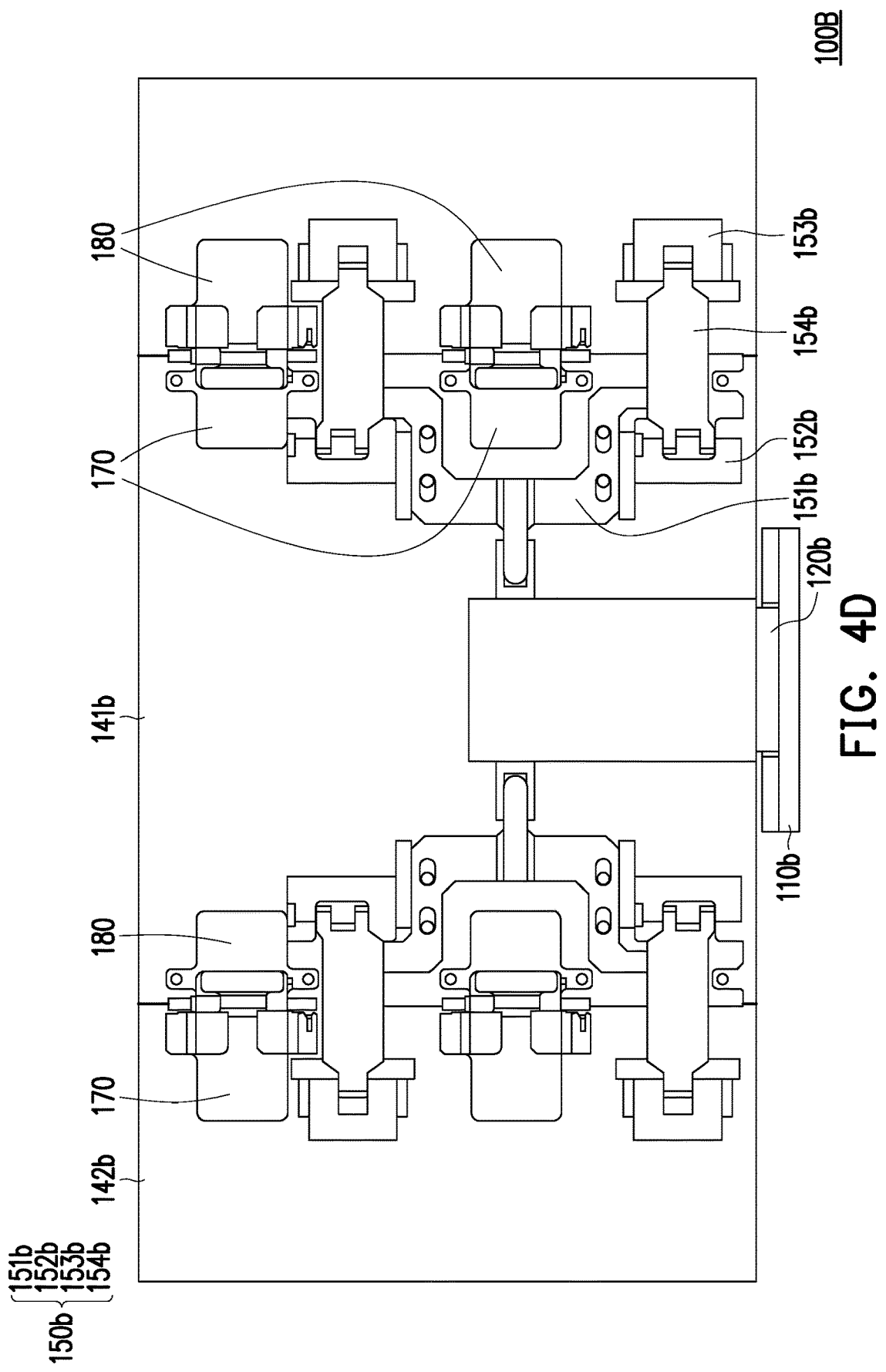
FIG. 4D is a schematic front view planar diagram of the flexible display in FIG. 4A adopting the bending module of the second embodiment in a touch mode.
Figure 4E:
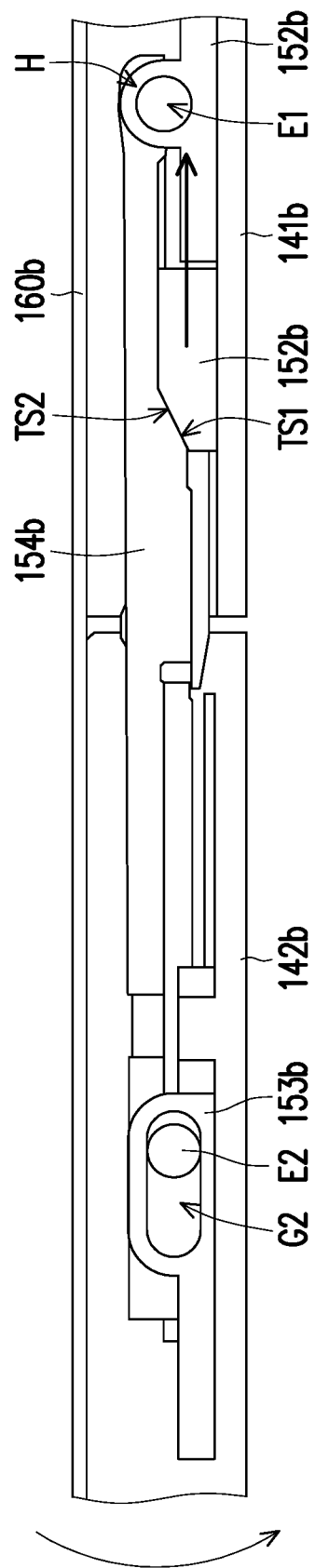
FIG. 4E is a schematic cross-sectional diagram of the flexible display in FIG. 4D along the line segment AA.
Figure 4F:
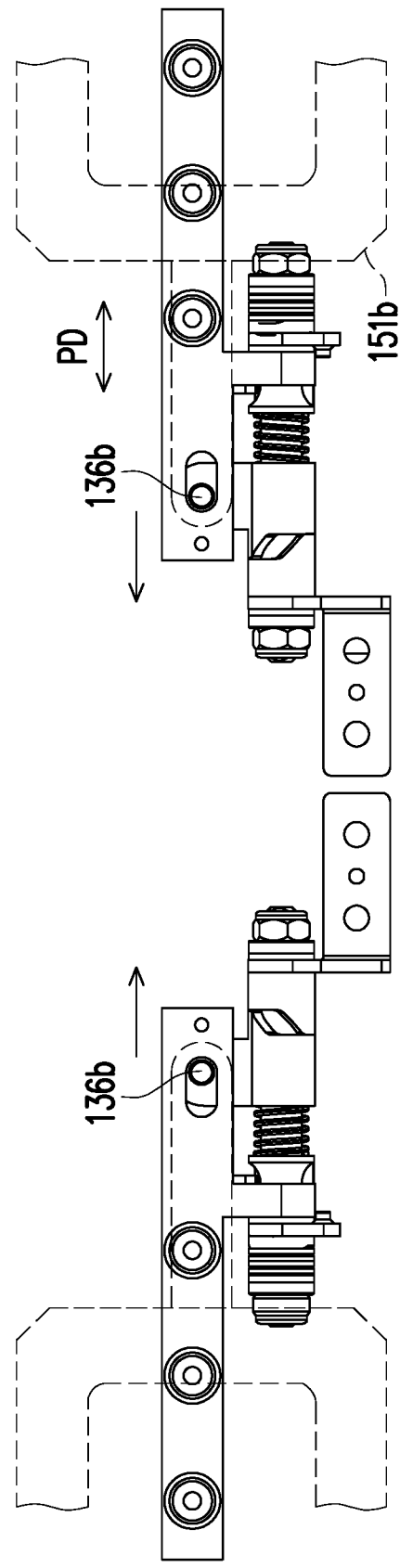
FIG. 4F is a schematic diagram of a position relationship between the bending module in FIG. 4A and the two hinge modules.

FIG. 4A is a schematic front view planar diagram of the flexible display in FIG. 1A adopting a bending module of a second embodiment in a view mode. FIG. 4B is a schematic cross-sectional diagram of the flexible display in FIG. 4A along a line segment AA. FIG. 4C is a schematic diagram of a position relationship between the bending module in FIG. 4A and two hinge modules. FIG. 4D is a schematic front view planar diagram of the flexible display in FIG. 4A adopting the bending module of the second embodiment in a touch mode. FIG. 4E is a schematic cross-sectional diagram of the flexible display in FIG. 4D along the line segment AA. FIG. 4F is a schematic diagram of a position relationship between the bending module in FIG. 4A and the two hinge modules.

Cooperatively referring to FIGS. 1A and 1B as well as FIGS. 4A and 4D, the flexible display 100 includes a plurality of internal rotating brackets 170 and a plurality of external rotating brackets 180. The plurality of internal rotating brackets 170 are disposed on the two sides of the fixed frame 141 respectively and face the flexible panel 160, the plurality of external rotating brackets 180 are disposed on the plurality of turning frames 142 respectively and face the flexible panel 160. Each of the external rotating brackets 180 is pivoted to each of the corresponding internal rotating brackets 170 so as to make each of the turning frames 142 be capable of pivoting relative to the fixed frame 141.

Referring to FIG. 4A and FIG. 4D, a bending module 150b adopted by a flexible display 100B of the present embodiment includes two intermediate connection rods 151b, a plurality of internal brackets 152b, a plurality of external brackets 153b and a plurality of ejection connection rods 154b.

Cooperatively referring to FIG. 4C and FIG. 4F, the two intermediate connection rods 151b are connected to two linkage pins 136b of two hinge modules 130B respectively. The plurality of internal brackets 152b are disposed on two sides of a fixed frame 141b respectively and face a flexible panel 160b. The plurality of external brackets 153b are disposed on a plurality of turning frames 142b respectively and face the flexible panel 160b. The plurality of ejection connection rods 154b are connected with the plurality of corresponding internal brackets 152b and the plurality of corresponding external brackets 153b respectively. A first end E1 of each of the ejection connection rods 154b is pivoted to each of the internal brackets 152b, and a second end E2 of each of the ejection connection rods 154b is rotatably and movably connected to each of the external brackets 153b.

Referring to FIG. 4B and FIG. 4E, further, each of the internal brackets 152b is provided with a penetration hole H. Each of the external brackets 153b is provided with a second sliding groove G2. The first end E1 of each of the ejection connection rods 154b is pivoted to the penetration hole H, and the second end E2 is disposed in the second sliding groove G2. Each of the intermediate connection rods 151b is provided with two first tilted surfaces TS1. Each of the ejection connection rods 154b is provided with a second tilted surface TS2. Each of the first tilted surfaces TS1 is in contact with each of the corresponding second tilted surfaces TS2.

Referring to FIG. 4A to FIG. 4C, when the flexible display 100B is switched to the view mode, the two intermediate connection rods 151b are suitable for being relatively away from each other in a horizontal direction PD through driving of the two linkage pins 136b to make the two first tilted surfaces TS1 of each of the intermediate connection rods 151b push the second tilted surface TS2 of each of the ejection connection rods 154b. The second end of each of the ejection connection rods 154b moves in the corresponding second sliding groove G2 so as to drive the plurality of turning frames 142b to be bent to the fixed frame 141b, and then the flexible panel 160b is bent.

Referring to FIG. 4D to FIG. 4F, when the flexible display 100B is switched to the touch mode, the two intermediate connection rods 151b are suitable for being relatively close to each other in the horizontal direction PD through driving of the two linkage pins 136b to make the two first tilted surfaces TS1 of each of the intermediate connection rods 151b be in full contact with the second tilted surface TS2 of each of the ejection connection rods 154b. The second end of each of the ejection connection rods 154b moves in the corresponding second sliding groove G2 so as to drive the plurality of turning frames 142b to be flush with the fixed frame 141b, and then the flexible panel 160b is straightened.

Figure 5A:
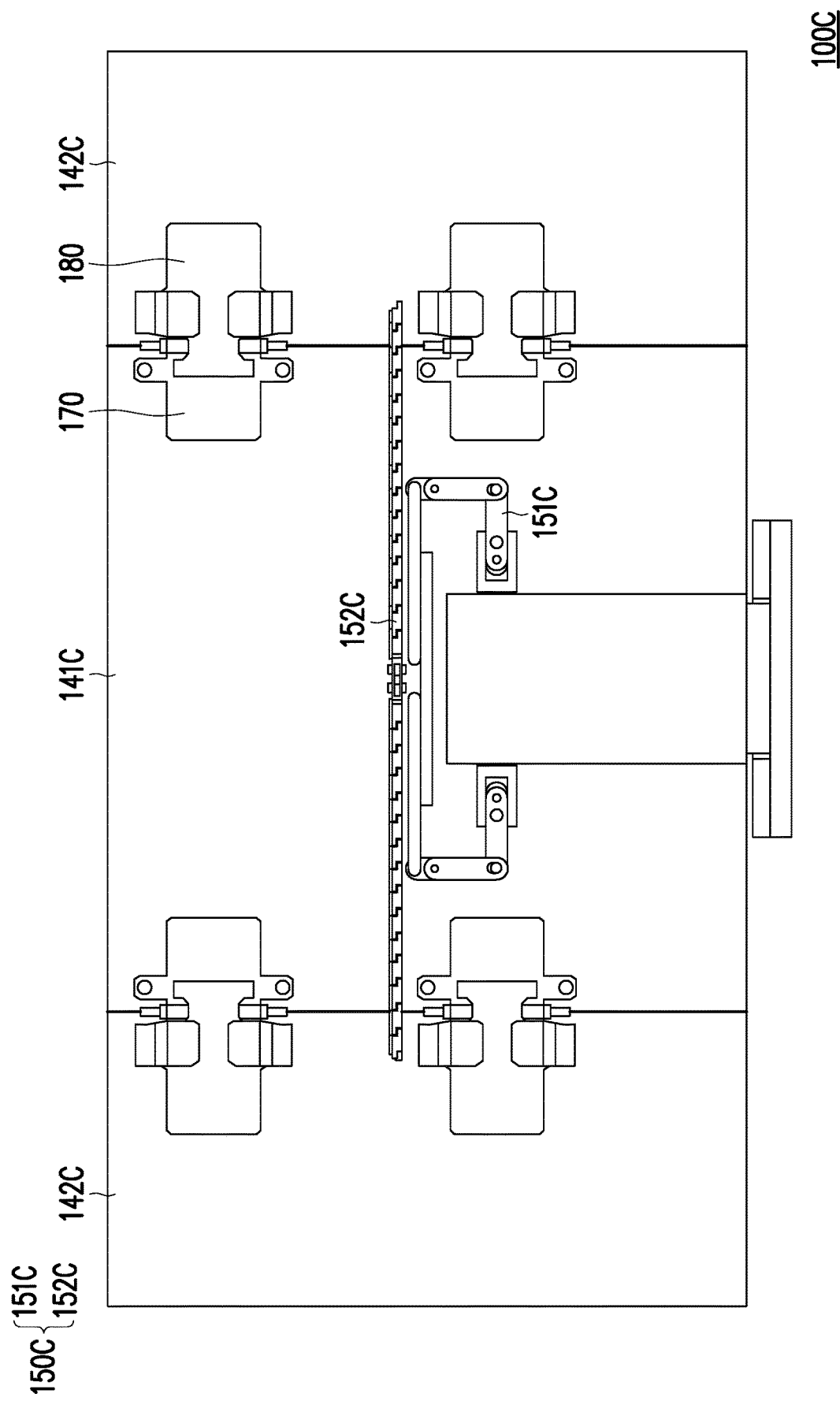
FIG. 5A is a schematic front view planar diagram of the flexible display in FIG. 1A adopting a bending module of a third embodiment in a view mode.
Figure 5B:
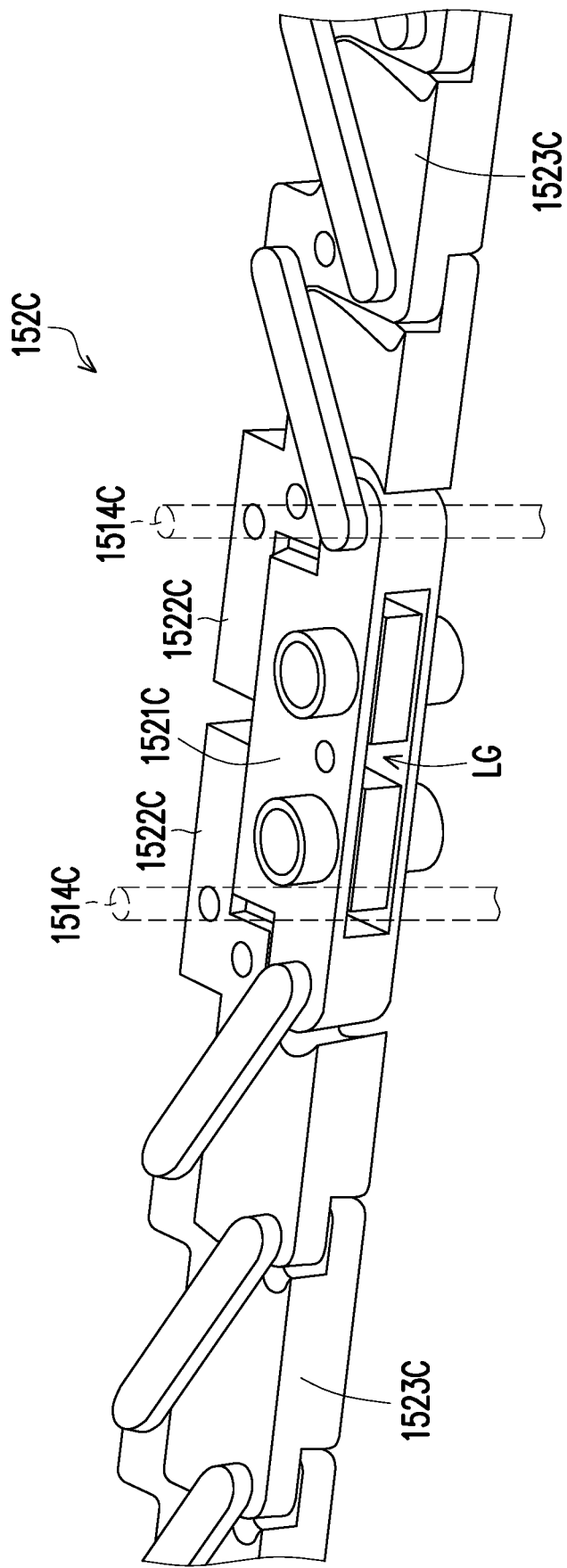
FIG. 5B is a partial schematic stereoscopic diagram of a transmission assembly in FIG. 5A.
Figure 5C:
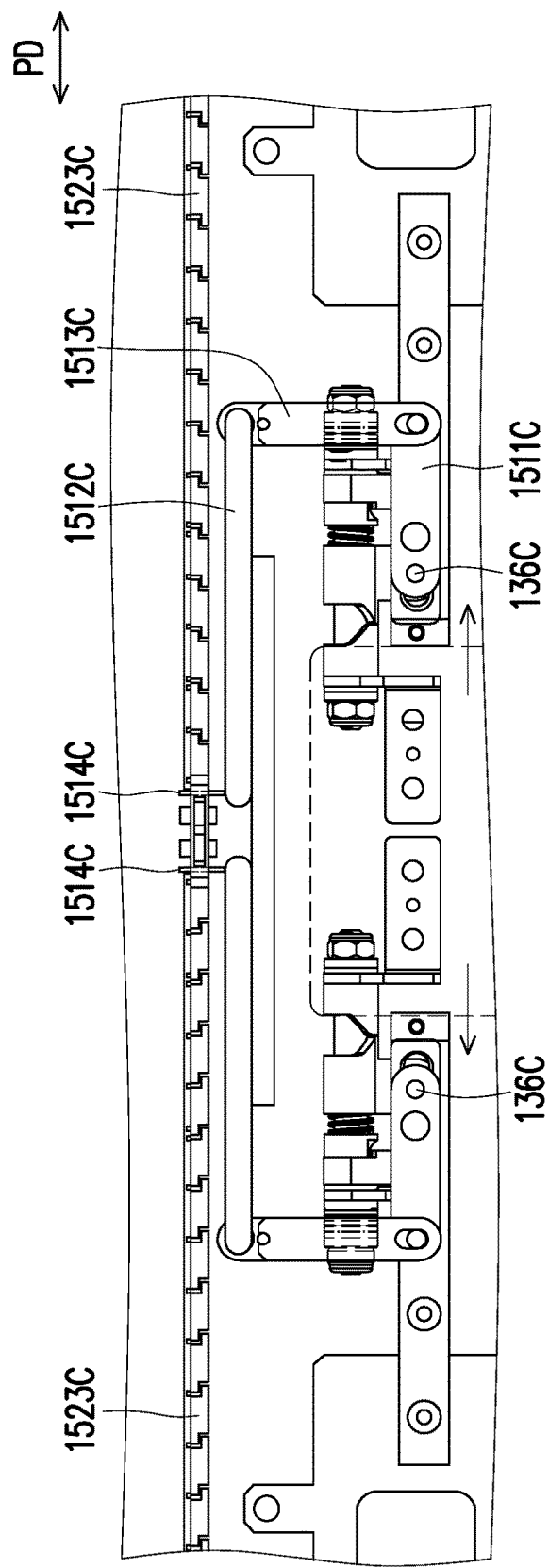
FIG. 5C is a schematic diagram of a position relationship between the bending module in FIG. 5A and two hinge modules.
Figure 5D:
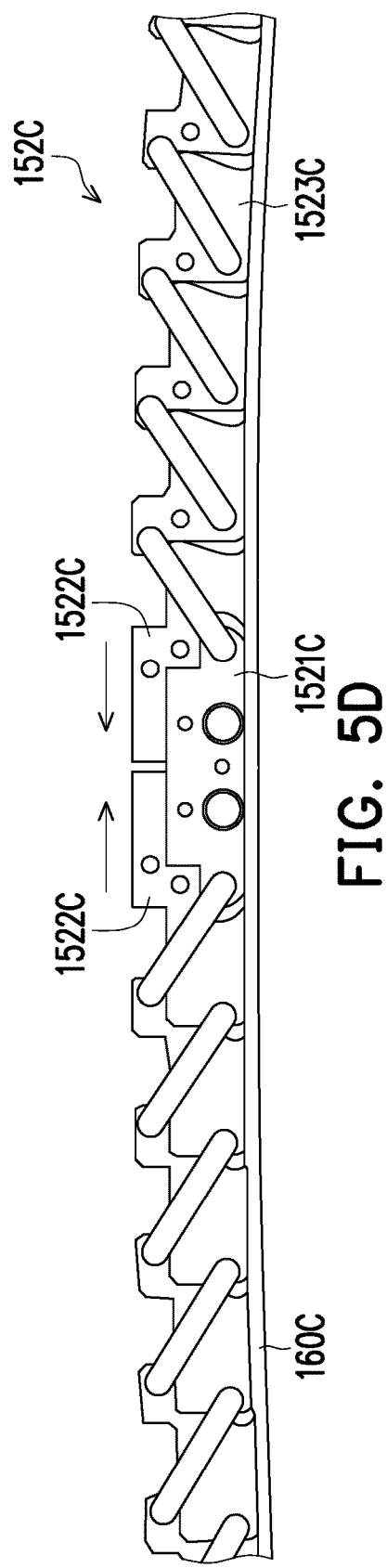
FIG. 5D is a schematic diagram of a position relationship between the transmission assembly in FIG. 5A and two connection rod assemblies.
Figure 5E:
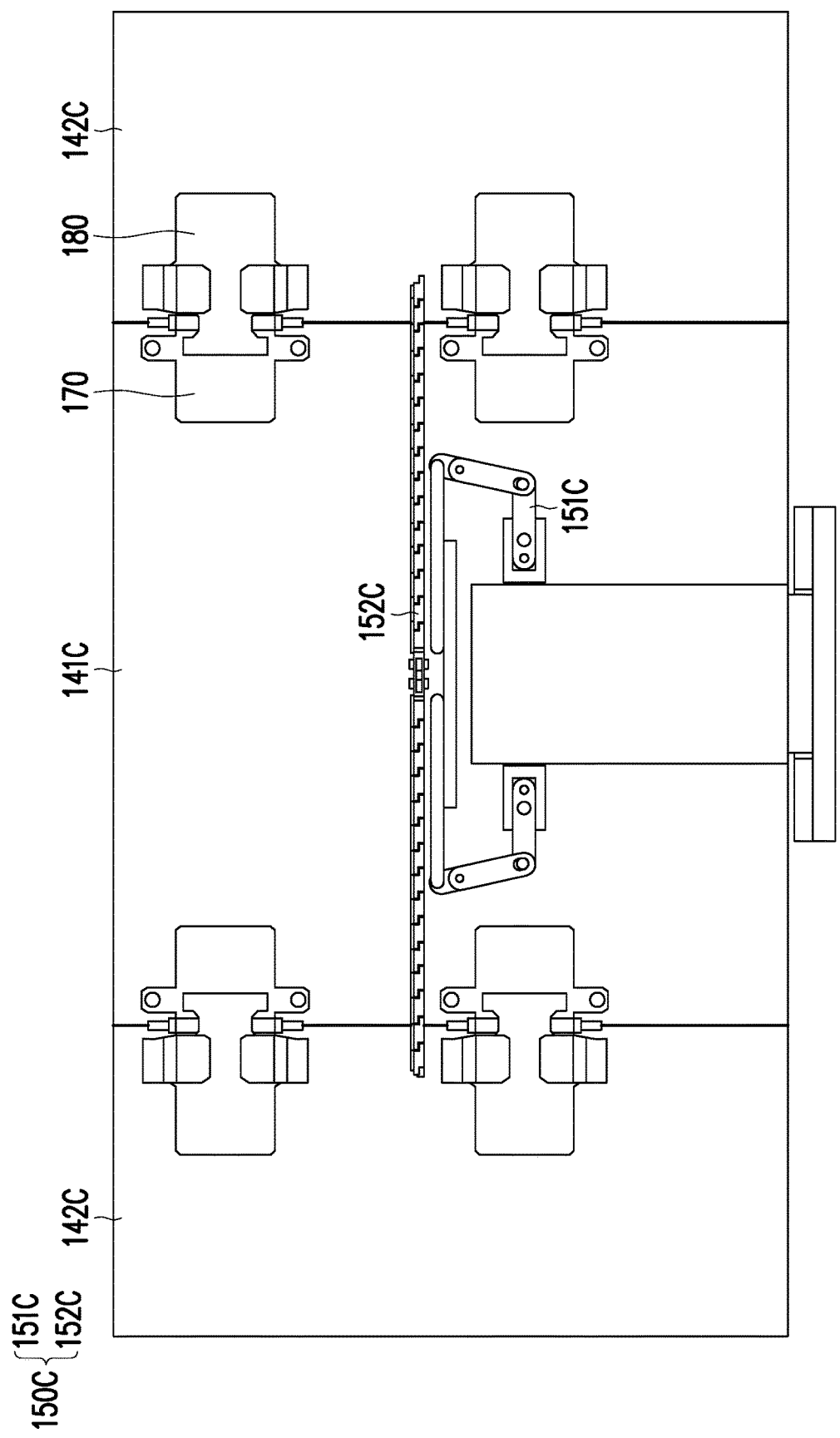
FIG. 5E is a schematic front view planar diagram of the flexible display in FIG. 5A switched to a touch mode.
Figure 5F:
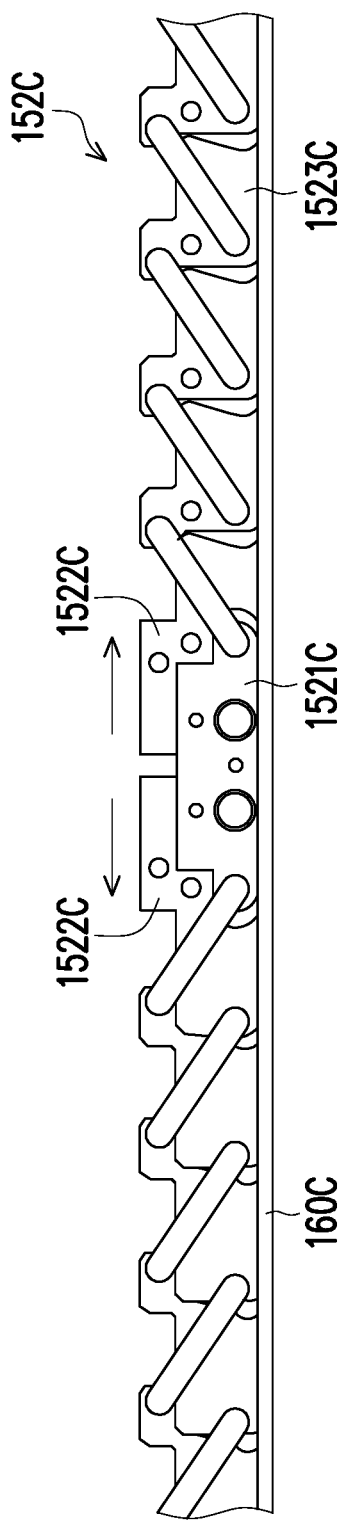
FIG. 5F is a schematic diagram of a position relationship between the transmission assembly in FIG. 5E and the two connection rod assemblies.

FIG. 5A is a schematic front view planar diagram of the flexible display in FIG. 1A adopting a bending module of a third embodiment in a view mode. FIG. 5B is a partial schematic stereoscopic diagram of a transmission assembly in FIG. 5A. FIG. 5C is a schematic diagram of a position relationship between the bending module in FIG. 5A and two hinge modules. FIG. 5D is a schematic diagram of a position relationship between the transmission assembly in FIG. 5A and two connection rod assemblies. FIG. 5E is a schematic front view planar diagram of the flexible display in FIG. 5A switched to a touch mode. FIG. 5F is a schematic diagram of a position relationship between the transmission assembly in FIG. 5E and the two connection rod assemblies.

Referring to FIG. 5A and FIG. 5B, a bending module 150c adopted by a flexible display 100C of the present embodiment includes two connection rod assemblies 151c and a transmission assembly 152c.

The two connection rod assemblies 151c are connected to two linkage pins 136c of two hinge modules 130c respectively. The transmission assembly 152c is connected to a fixed frame 141c and part of two turning frames 142c of a frame body 140c and is parallel to a horizontal direction PD. The two connection rod assemblies 151c are suitable for relatively moving in the horizontal direction PD to drive the transmission assembly 152c to bend so as to make the two turning frames 142c be bent to the fixed frame 141c or drive the transmission assembly 152c to restore to a linear appearance so as to make the two turning frames 142c be flush with the fixed frame 141c.

Further, referring to FIG. 5B, the transmission assembly 152c is provided with a base 1521c, two moving blocks 1522c and two chain structures 1523c. The base 1521c is provided with a sliding groove LG. The two moving blocks 1522c are slidably connected to the sliding groove LG. The two chain structures 1523c are pivoted to two sides of the base 1521c respectively and in contact with the two moving blocks 1522c. Referring to FIG. 5A and FIG. 5C, each of the connection rod assemblies 151c is provided with a sliding rod 1511c, a driving rod 1512c and a lever 1513c. Each of the sliding rods 1511c is connected to each of the corresponding linkage pins 136c. The driving rod 1512c is parallel to the sliding rod 1511c and penetrates through the corresponding moving block 1522c through a pin 1514c. The lever 1513c is rotatably connected with the sliding rod 1511c and the driving rod 1512c respectively.

Referring to FIG. 5A, FIG. 5C and FIG. 5D, when the flexible display 100C is switched to the view mode, two first cam members 134c and the two linkage pins 136c are suitable for driving the two sliding rods 1511c to move relatively away from each other in the horizontal direction PD and be perpendicular to the two levers 1513c, and driving the two moving blocks 1522c to be close to each other on the base 1521c through the two levers 1513c and the two driving rods 1512c, thus the two chain structures 1523c are bent so as to make the two turning frames 142c be bent to the fixed frame 141c, and then a flexible panel 160c is bent.

Referring to FIG. 5E and FIG. 5F, when the flexible display 100C is switched to the touch mode, the two first cam members 134c are suitable for driving the two sliding rods 1511c to move relatively close to each other in the horizontal direction PD and form an acute angle with the two levers 1513c, and driving the two moving blocks 1522c to be away from each other on the base 1521c through the two levers 1513c and the two driving rods 1512c, thus the two chain structures 1523c are straightened so as to make the two turning frames 142c be flush with the fixed frame 141c, and then the flexible panel 160c is straightened.

FIG. 6A is a schematic front view planar diagram of the flexible display in FIG. 1A adopting a bending module of a fourth embodiment in a touch mode. FIG. 6B is a schematic top view planar diagram of the flexible display in FIG. 6A. FIG. 6C is a schematic top view planar diagram of the flexible display in FIG. 6A switched to a view mode.

Referring to FIG. 6A to FIG. 6C, a bending module 150D adopted by a flexible display 100D of the present embodiment includes two sliding connection rods 151d, a plurality of bending connection rods 152d, a fixed bracket 153d and a plurality of pivoting brackets 154d.

The two sliding connection rods 151d are movably disposed on a fixed frame 141d and connected with two linkage pins 136d of two hinge modules 130d. Each of the sliding connection rods 151d abuts against each of turning frames 142d. The plurality of bending connection rods 152d are rotatably disposed on the fixed frame 141d and located on the plurality of turning frames 142d respectively. The fixed bracket 153d is disposed at a center of the fixed frame 141d and faces a flexible panel 160d. The plurality of pivoting brackets 154d are disposed at a plurality of edges of the fixed frame 141d. Two adjacent ends of the two sliding connection rods 151d movably penetrate through the fixed bracket 153d, and each of the bending connection rods 152d rotatably penetrates through each of the corresponding pivoting brackets 154d.

Further, a frame body 140d further includes a plurality of outer frames 143d, which are pivoted to the plurality of corresponding turning frames 142d respectively. The plurality of bending connection rods 152d abut against the plurality of corresponding outer frames 143d respectively.

Referring to FIG. 6A and FIG. 6B, when the flexible display 100D is switched to the touch mode, the two linkage pins 136d of the two hinge modules 130d drive the two sliding connection rods 151d to move relatively close to each other in the horizontal direction PD and the two bending connection rods 152d to pivot so as to drive the plurality of turning frames 142d to be flush with the fixed frame 141d and the plurality of outer frames 143d to be flush with the plurality of corresponding turning frames 142d respectively, and thus the flexible panel 160d is straightened.

Referring to FIG. 6C, when the flexible display 100D is switched to the view mode, the two linkage pins 136d of the two hinge modules 130d drive the two sliding connection rods 151d to move relatively away from each other in the horizontal direction PD and the two bending connection rods 152d to pivot so as to drive the plurality of turning frames 142d to be bent to the fixed frame 141d and the plurality of outer frames 143d to be bent to the plurality of corresponding turning frames 142d respectively, and thus the flexible panel 160d is bent.

Based on the foregoing, the flexible display of the invention is suitable for being switched to the view mode and the touch mode. In the view mode, the bending module bends the frame body so as to increase a bending radian of the flexible panel. This is similar to a principle of visual imaging of human eyes, and is conducive to reducing rotation of eyes/a head and relieving fatigue. In the touch mode, the bending module straightens the frame body so as to make the flexible panel restore to be a plane. In addition, the frame body and the flexible panel may rotate relative to the support plate through the two hinge modules so as to change an angle, so as to be suitable for a long-time touch operation.

The flexible display of the invention can be quickly switched to the view mode and the touch mode, can overcome a defect that an existing display cannot have a curved screen and plane touch simultaneously, and realize good user experience.

What is claimed is:

1. A flexible display comprising:
    a bottom plate;
    a support plate provided with a first end and a second end, wherein e first end is rotatably connected to the bottom plate;
    two hinge modules disposed at the second end of the support plate;
    a frame body provided with a fixed frame and a plurality of turning frames, wherein the fixed frame is connected to the hinge modules, and the turning frames are pivoted to two opposite sides of the fixed frame respectively;
    a bending module connected with the fixed frame and the turning frames; and
    a flexible panel disposed on one side of the frame body and covering the bending module,
    wherein when the flexible display is switched to a touch mode, the bending module drives the turning frames to be flush with the fixed frame so that the flexible panel is in a flat plate shape, and
    when the flexible display is switched to a view mode, the bending module drives the turning frames to be bent relative to the fixed frame so that the flexible panel is in a curved shape,
    wherein the frame body further comprises a back cover and a covering outer layer, the back cover is disposed on the other side of the frame body relative to the flexible panel, and the covering outer layer is disposed on the back cover,
    wherein the back cover is provided with a plurality of gaps arranged in a staggered manner, and in the view mode, the back cover and the covering outer layer bend along with the frame body so that a size of each of the gaps is greater than a size of each of the gaps in the touch mode.

2. The flexible display according to claim 1, wherein when the flexible display is switched to the touch mode, the support plate turns in a first turning direction relative to the bottom plate, and a first included angle between the support plate and the bottom plate is an acute angle, and
    the frame body turns in a second turning direction opposite to the first turning direction relative to the support plate through the hinge modules, and a second included angle between the frame body and the support plate is an acute angle.

3. The flexible display according to claim 2, wherein when the flexible display is switched to the view mode, the support plate turns in the second turning direction relative to the bottom plate, and a first included angle between the support plate and the bottom plate is a right angle, and
    the frame body turns in the first turning direction relative to the support plate through the hinge modules, and the frame body and the support plate are parallel to each other.

4. The flexible display according to claim 1, further comprising a plurality of internal rotating brackets and a plurality of external rotating brackets, wherein the internal rotating brackets are disposed on two sides of the fixed frame respectively and face the flexible panel, the external rotating brackets are disposed on the turning frames respectively and face the flexible panel, and each of the external rotating brackets is pivoted to the respective corresponding internal rotating bracket so that each of the turning frames is capable of pivoting relative to the fixed frame.

5. The flexible display according to claim 1, wherein each of the hinge modules comprises:
    a rotating shaft;
    a first bracket rotatably sleeved on the rotating shaft, connected with the frame body, and provided with a first sliding groove;
    a second bracket fixedly sleeved on the rotating shaft and connected with the second end of the support plate;
    a first cam member rotatably and movably sleeved on the rotating shaft;
    a second cam member fixedly sleeved on the rotating shaft and adjacent to the second bracket; and
    a linkage pin penetrating through the first cam member and the first sliding groove and connected with the bending module,
    wherein when pivoting in a first axial direction, the first bracket drives the first cam member to slide on the rotating shaft so as to closely abut against the second cam member, and the first cam member drives the linkage pin to move relatively close to the second cam member, and when pivoting in a second axial direction opposite to the first axial direction, the first bracket drives the first cam member to slide on the rotating shaft so as to partly abut against the second cam member and form a distance, and the first cam member drives the linkage pin to move relatively away from the second cam member.

6. The flexible display according to claim 5, wherein each of the hinge modules further comprises a torsion member and an auxiliary elastic member, the torsion member is fixedly sleeved on one end of the rotating shaft away from the second cam member and is in contact with the first bracket so as to provide a torsion, and the auxiliary elastic member is sleeved on the rotating shaft and abuts against the first cam member so as to provide an elastic force.

* * * * *